United States Patent
Sutz

(10) Patent No.: US 10,030,628 B2
(45) Date of Patent: Jul. 24, 2018

(54) HORIZONTAL AXIS WIND MACHINE WITH MULTIPLE ROTORS

(75) Inventor: Richard K. Sutz, Scottsdale, AZ (US)

(73) Assignee: THUNDERBIRD POWER CORP, Queen Creek, AZ (US)

( * ) Notice: Subject to any disclaimer, the term of this patent is extended or adjusted under 35 U.S.C. 154(b) by 826 days.

(21) Appl. No.: 13/479,773

(22) Filed: May 24, 2012

(65) Prior Publication Data
US 2013/0315732 A1 Nov. 28, 2013

(51) Int. Cl.
*F03D 1/02* (2006.01)
*F03D 1/06* (2006.01)
*F03D 15/00* (2016.01)

(52) U.S. Cl.
CPC ......... *F03D 1/025* (2013.01); *F03D 1/0625* (2013.01); *F03D 1/0633* (2013.01); *F03D 15/00* (2016.05); *F05B 2240/2211* (2013.01); *F05B 2240/232* (2013.01); *F05B 2260/403* (2013.01); *F05B 2260/85* (2013.01); *F05B 2270/508* (2013.01); *Y02E 10/721* (2013.01)

(58) Field of Classification Search
CPC . F03D 1/06; F03D 1/02; F03D 1/0608; F03D 1/0641; F03D 1/065; F03D 1/0658; F03D 1/0666; F03D 1/0675; F03D 1/0691; F03D 1/025; F03D 11/02; F03D 1/0625; F03D 1/0633; F16H 1/00; F16H 1/003; F16D 11/00; B64C 5/06; F05B 2240/2211; F05B 2270/508; F05B 2260/85; F05B 2240/232; F05B 2260/403
See application file for complete search history.

(56) References Cited

U.S. PATENT DOCUMENTS

| | | | | |
|---|---|---|---|---|
| 508,009 A * | 11/1893 | George | ............... | B63H 5/10 416/124 |
| 556,914 A * | 3/1896 | Bramwell | ............... | F03D 9/001 416/12 |
| 1,780,431 A * | 11/1930 | McCarroll | ............... | B64C 11/34 416/155 |
| 3,827,482 A * | 8/1974 | Pope | ............... | F04D 29/384 123/41.49 |
| 3,974,396 A | 8/1976 | Schonball | | |
| 4,006,925 A | 2/1977 | Scherer | | |
| 4,065,225 A * | 12/1977 | Allison | ............... | F03D 1/025 416/11 |
| 4,370,095 A | 1/1983 | Sleeper, Jr. | | |
| 4,533,297 A * | 8/1985 | Bassett | ............... | 416/132 B |

(Continued)

FOREIGN PATENT DOCUMENTS

DE 41 36 956 A1 5/1993
DE 100 03 385 A1 8/2001
(Continued)

*Primary Examiner* — Eldon Brockman

(57) ABSTRACT

A horizontal-shaft wind machine having improved low wind speed performance and greater overall efficiency consists of multiple rotors, wherein each successive rotor is larger in diameter than the previous rotor moving from the most windward rotor to the most leeward rotor. Each rotor may be coupled to a separate concentric shaft, and all rotors may rotate in the same direction with the output shafts of each rotor coupled via an overrunning clutch to a single shaft, the output of which is used to drive the load. Winglets attached to the leading edge and tip of the rotor sails improve low wind startup torque.

12 Claims, 7 Drawing Sheets

(56) References Cited

U.S. PATENT DOCUMENTS

| | | | | |
|---|---|---|---|---|
| 5,474,425 A * | 12/1995 | Lawlor | ...................... | 416/223 R |
| 5,506,453 A | 4/1996 | McCombs | | |
| 6,039,533 A * | 3/2000 | McCabe | ........................ | 415/146 |
| 7,044,713 B2 * | 5/2006 | Joo | ........................... | F03D 1/02 |
| | | | | 290/55 |
| 7,074,011 B1 * | 7/2006 | Wobben | ........................ | 416/126 |
| 7,252,478 B2 * | 8/2007 | Aynsley | ....................... | 416/204 R |
| 7,267,530 B2 * | 9/2007 | McCabe | .................... | 416/196 A |
| 7,384,239 B2 | 6/2008 | Wacinski | | |
| 7,931,444 B2 * | 4/2011 | Godsk et al. | ................. | 416/228 |
| 8,033,372 B2 * | 10/2011 | Chiesa et al. | .................. | 192/46 |
| 8,753,080 B2 * | 6/2014 | Morimoto | ............. | F03D 1/0658 |
| | | | | 416/1 |
| 8,777,557 B2 * | 7/2014 | Zhang | .................... | F03D 1/025 |
| | | | | 415/123 |
| 2005/0214119 A1 | 9/2005 | Miller | | |
| 2006/0239821 A1 * | 10/2006 | McCabe | ................ | F03D 1/025 |
| | | | | 416/197 A |
| 2009/0224555 A1 * | 9/2009 | Zhencai | ......................... | 290/55 |
| 2010/0215502 A1 * | 8/2010 | Harrison | ....................... | 416/205 |
| 2010/0225190 A1 * | 9/2010 | Huang | ......................... | 310/115 |

FOREIGN PATENT DOCUMENTS

| | | | |
|---|---|---|---|
| EP | 2 327 875 A1 | | 6/2011 |
| GB | 2382381 A | * | 5/2003 |

* cited by examiner

HORIZONTAL AXIS WIND MACHINE WITH MULTIPLE ROTORS

BACKGROUND OF THE INVENTION

This invention relates generally to wind machines, and in particular to so-called horizontal-shaft wind machines.

A wind machine is a device for extracting energy from the wind. A typical horizontal axis wind machine consists of a pivoting platform mounted to the top of a tower. Attached to the pivoting platform is a rotor assembly joined to a power transmission system by horizontal shaft. The power transmission system is coupled to a work-performing device, for example an electrical generator or pushrod for pumping water. Wind machines can generally be divided into two categories: Lift-type and drag-type. Lift-type wind machines use slender airfoils similar to airplane propellers, which create lift as the wind passes over the airfoils to rotate the wind machine rotor assembly. As with aircraft propellers, the pitch of the lift-type airfoils must be matched to the windspeed for maximum efficiency and the pitch typically varies from the root of the airfoil to the tip in order to compensate for the different path velocity of the airfoil along the leading edge. Drag-type wind machines use relatively wide sails with large surface areas, which act to slow the wind striking the sails and convert a portion of the kinetic energy of the wind into rotary motion of the wind machine rotor. Drag-type wind machines typically include a rudder that extends from the rear of the wind machine head for aligning the wind machine so that the rotor always faces the wind.

Conventional wind machines, be they lift-type or drag-type typically comprise a single set of blades or a single rotor rotating about a horizontal shaft. Theoretically, the aerodynamic efficiency yielded by a single set of blades or by a single rotor cannot exceed 59.6% (See Betz, A. "Wind-Energie and Ihre Ausnutzun durch Windmuelen," van den Hoeck & Ruprech, Goettingen, 1926). In practice, the output of typical single-bladed wind machines is substantially below 59.6%.

Multiple-rotor wind machines have been suggested as a solution to the limited aerodynamic efficiency of single bladed wind machines. U.S. Pat. No. 3,974,396 to Schonball discloses a lift-type windmill having two axially-displaced counter-rotating rotors in which one rotor drives the armature and the other rotor drives the stator of an electrical generator. This arrangement of counter-rotating blades enables the relative rotational speed between the armature and stator to be multiplied.

U.S. Pat. No. 7,384,239 to Wacinski discloses a lift-type windmill having two axially-displaced coaxial counter-rotating rotors each having two or more airfoils. The output of the counter-rotating rotors is combined through a planetary transmission to drive the single input shaft of an electrical generator.

U.S. Pat. No. 4,065,225 Allison discloses a multiple vane lift-type windmill having a plurality of axially-displaced rotors each having blades that are spring loaded to adjust the blade pitch as the rotor speed increases. The rotors of Allison are attached to a single shaft and do not counter-rotate. None of these patents suggest a drag-type wind machine in which the multiple rotors increase in diameter in a downwind direction, nor do they suggest a drag-type wind machine in which the rotors are angled rearward along a conical surface, nor a drag-type wind machine in which the sails have winglets formed on the leading and/or tip edges of the sails.

SUMMARY OF THE INVENTION

The present invention comprises a horizontal wind machine having improved low-wind operability. According to one embodiment of the present invention, a wind machine comprises a horizontally extending shaft with sails coupled to the shaft, extending radially outward from the shaft for rotating the shaft. Each sail comprises a front surface facing the wind and a leading edge that moves through the air as the shaft rotates. A winglet extends outward from the leading edge of each sail and curls back over the front surface of the sail for improving the efficiency of the wind machine, by capturing wind that would otherwise slide off the leading edge of the sail.

In another embodiment of the present invention, the sails extend from the shaft in a direction that is not in a plane perpendicular to the shaft, but instead the sails are angled backward along a conical surface. This configuration will cause wind that strikes the sail and slides along the surface to be caught by the winglets at the ends of the rotor blades to impart more force in the direction of rotation, thus improving the efficiency of the wind machine.

In another embodiment, the wind machine comprises a first rotor coupled to a first shaft and a second rotor coupled to a second shaft, wherein the second shaft is coaxial with the first shaft. The second shaft is coupled to the first shaft via an overrunning clutch mechanism, such as a ratchet and pawl, which allows the second shaft to transmit torque to the first shaft if the second shaft would otherwise rotate faster than the first shaft. The coupled rotors produce more torque than a conventional wind machine having only one rotor sail assembly of equal outer diameter. Each rotor sail assembly may have non-planar sail orientations as described above and/or winglets extending from either or both of the leading edges of the sails or the tips of the sails.

BRIEF DESCRIPTION OF THE DRAWING

The present invention will be better understood from a reading of the following detailed description, taken in conjunction with the accompanying drawing Figs. in which like references designate like elements and, in which.

DETAILED DESCRIPTION

Figure 1:
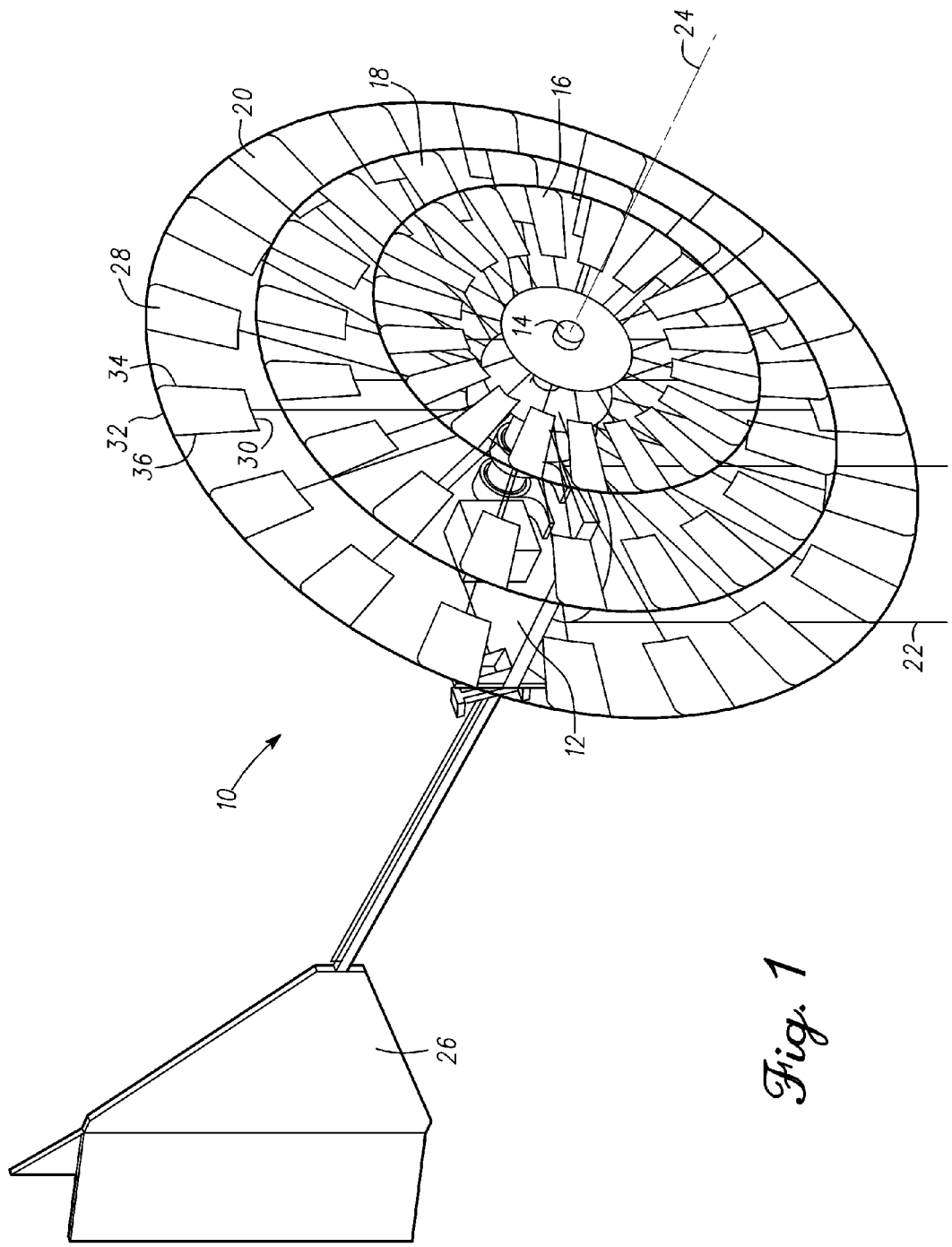
FIG. 1 is a front-perspective view of a wind machine incorporating features of the present invention.

The drawing figures are intended to illustrate the general manner of construction and are not necessarily to scale. In the detailed description and in the drawing figures specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

With reference to FIGS. 1-6 and in particular FIG. 1, a horizontal wind machine 10 incorporating features of the present invention comprises a wind machine head 12 which supports a horizontal shaft 14. Horizontal shaft 14, in turn, supports wind machine rotors 16, 18 and 20. Wind machine head 14 is attached to the vertical support column 22 by a thrust bearing (not shown), which enables wind machine head 14 to be aligned so that the rotational axis 24 of shaft 14 can be aligned with the wind direction. Wind machine 10 further comprises a tail section or rudder 26, which aligns the wind machine head 12 so that rotors 16, 18 and 20 face the wind.

Each of rotors 16, 18 and 20 have a plurality of sails 28 attached substantially equidistant from shaft 14 to create a substantially rotationally balanced circular rotor. Each of the plurality of sails 28 has a root 30, a tip 32, a leading edge 34, and a trailing edge 36. Sails 28 may be of any conventional construction, for example fabric, sheet metal, or ultraviolet-resistant plastic, but in the illustrative embodiment are formed of galvanized steel sheet. The support structure of rotors 16, 18 and 20 is of conventional design as may be found on prior art drag-type wind machines.

Figure 2:
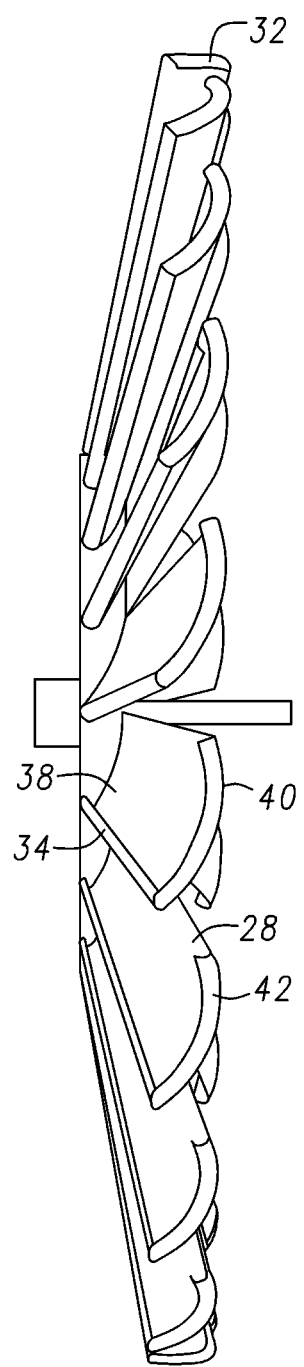
FIG. 2 is a side-view of one of the wind machine rotors shown in the embodiment of FIG. 1.
Figure 3:
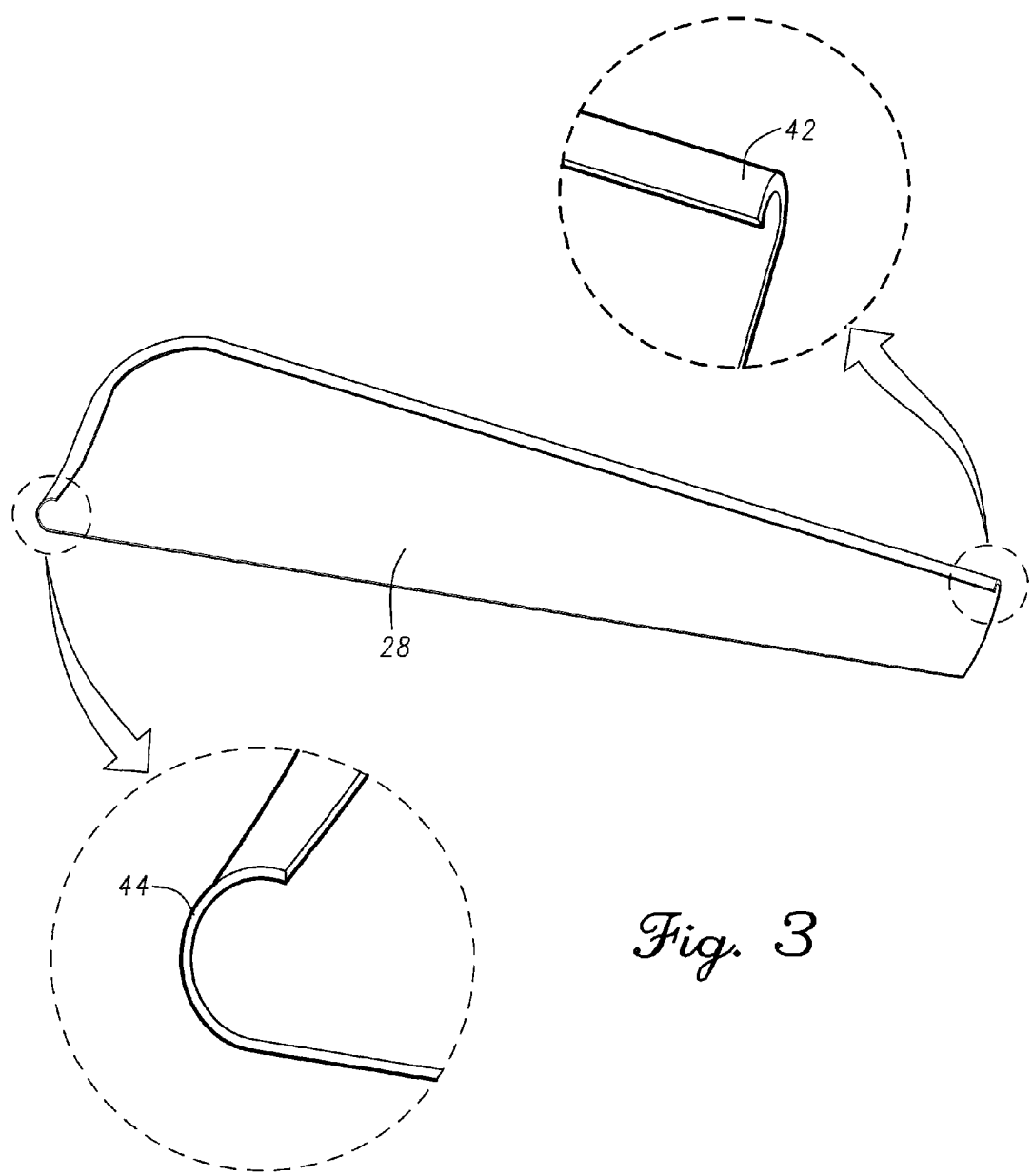
FIG. 3 is a perspective view of one of the wind machine sails shown in the embodiment of FIG. 2.

As shown most clearly in FIG. 2, each of sails 28 has a concave front surface 38 that faces the wind and a convex back surface 40 that faces away from the wind. Each of sails 28 further comprises one or more winglets 42 formed at the tip 32 and/or leading edge 34 of sail 28. With further reference to FIG. 3, each of winglets 42 comprises a substantially circular or arcuate section 44 that extends in the windward direction over the front surface of sail 28 and curls back over the front surface 38 of sail 28. Although not wishing to be held to any particular theory of operation, it is believed that without winglets, especially in low-wind conditions, a significant portion of the wind actually spills over the leading-edge and tip of a conventional wind machine sail. Winglets 44 capture the energy of this wind, which would otherwise be lost.

The rotor design described herein will improve low wind speed start up torque. The winglet along the leading edge of the sail will capture some of the wind energy that would otherwise slide off the sail. The winglet at the tip of the sail also captures some wind that would otherwise slide off the tip. A rotor equipped with winglets will start to rotate and impart meaningful energy to a driveshaft in a lower wind speed than a rotor without winglets. The leading edge winglets and the sail tip winglets may be used separately or in conjunction, depending on the design requirements. If used alone, the tip winglets should wrap around to encompass a part of the leading edge near the top end of the sail.

Figure 4:
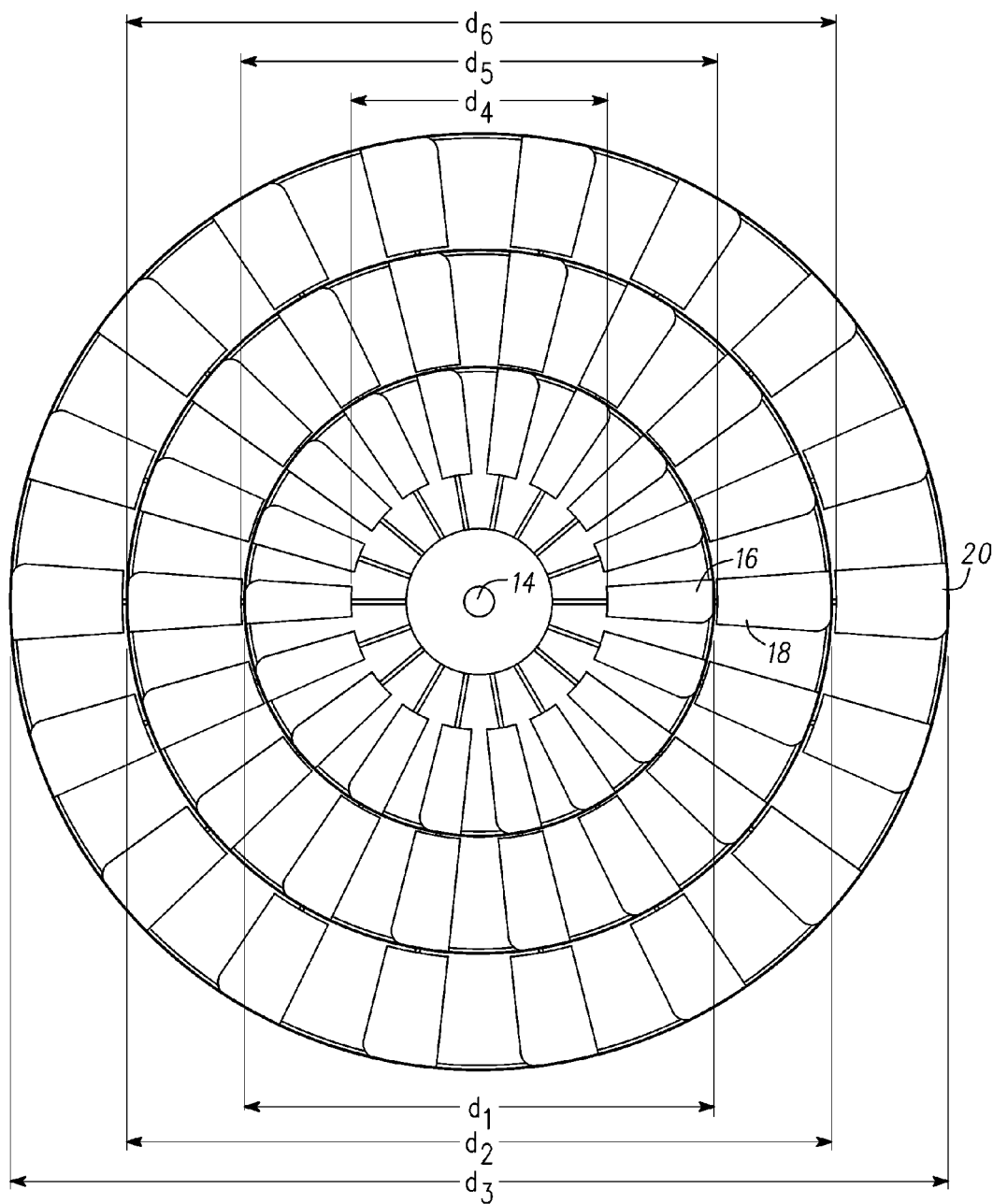
FIG. 4 is a front plan view of the embodiment of FIG. 1.

With additional reference to FIG. 4, the tips 32 of sails 28 forming rotor 16 form a circle having an outer diameter $d_1$. Similarly the tips 32 of sails 28 forming rotor 18 form a circle having an outer diameter $d_2$ and the tips 32 of sails 28 forming rotor 20 form a circle having an outer diameter $d_3$. The outer diameter $d_1$ of rotor 16 is smaller than the outer diameter $d_2$ of rotor 18 and the outer diameter $d_2$ of rotor 18 is smaller than diameter $d_3$ of rotor 20. The roots 30 of sails 28 forming rotor 16 also form a circle having an inner diameter $d_4$. Similarly the roots 30 of sails 28 forming rotor 18 form a circle having an inner diameter $d_5$ and the roots 30 of sails 28 forming rotor 20 form a circle having an inner diameter $d_6$. The inner diameter $d_4$ of rotor 16 is smaller than the inner diameter $d_5$ of rotor 18 and the inner diameter $d_5$ of rotor 18 is smaller than diameter $d_6$ of rotor 20. Preferably, the inner diameter $d_5$ of rotor 18 is equal to the outer diameter $d_1$ of rotor 16 within ±50% of the length of blade 28 (from root 30 to tip 32) and the inner diameter $d_6$ of rotor 20 is equal to the outer diameter $d_2$ of rotor 18 within ±50% of the length of blade 28.

Figure 5:
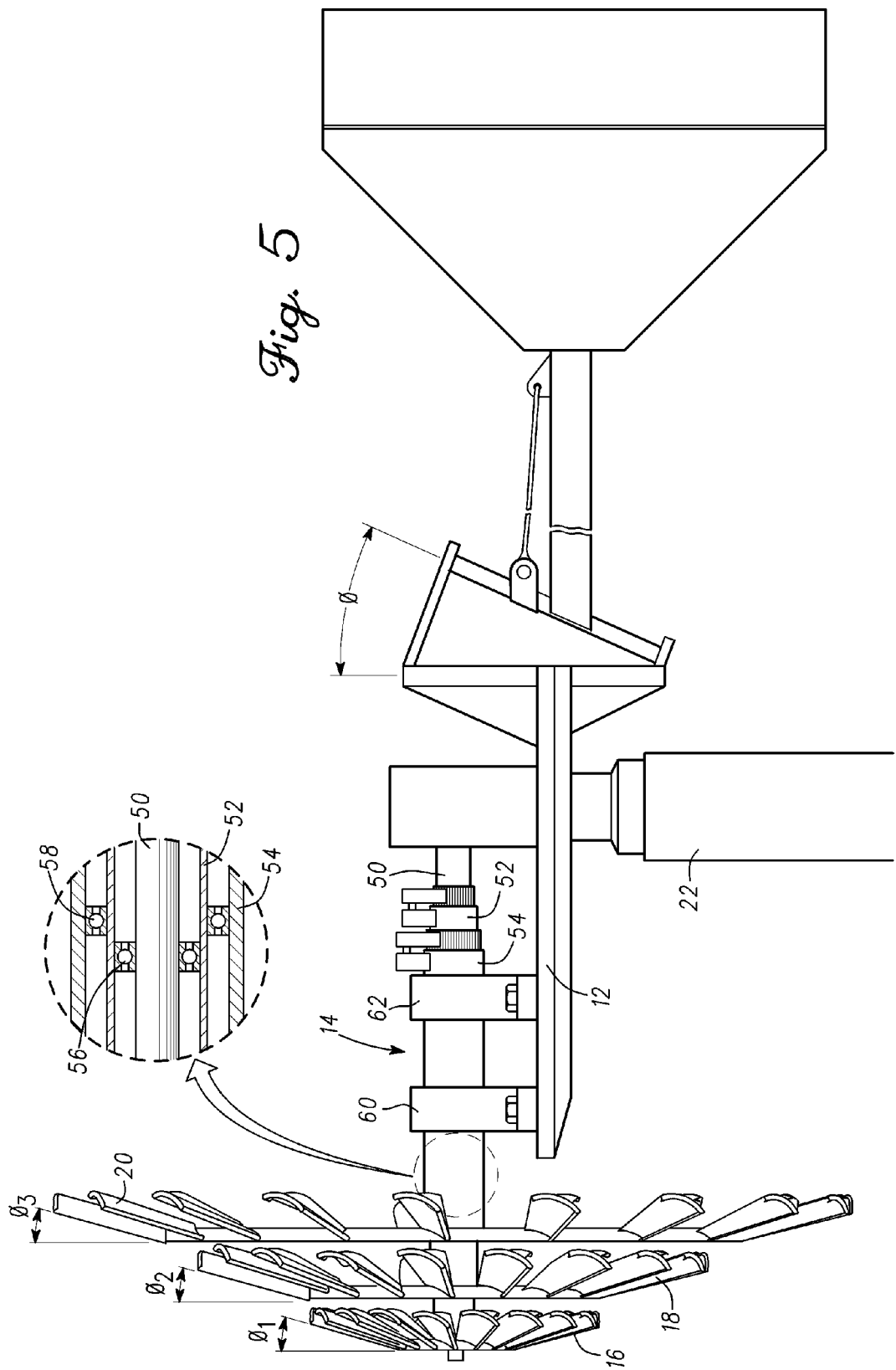
FIG. 5 is a side view of a the embodiment of FIG. 1.

With reference to FIG. 5, the sails 28 forming rotor 16 do not lie in a plane that is perpendicular to shaft 14. Instead sails 28 forming rotor 16 lie along a conical surface tapering downwind at an angle $\theta_1$ measured perpendicular to shaft 14. Similarly, sails 28 forming rotor 18 lie along a conical surface having an angle $\theta_2$ measured perpendicular to shaft 14 and sails 28 forming rotor 2 lie along a conical surface having an angle $\theta_3$ measured perpendicular to shaft 14. The angles $\theta_1$, $\theta_2$, and $\theta_3$ may be equal or may be unequal. Preferably the angles $\theta_1$, $\theta_2$, and $\theta_3$ are at least 8 degrees and are preferably from 11-25 degrees and most preferably are about 15±2 degrees. The conical orientation of the rotors causes wind that would otherwise slide off the root of the sail instead to slide toward the tip of the sail, imparting force to the sail surface during the process.

Figure 6:
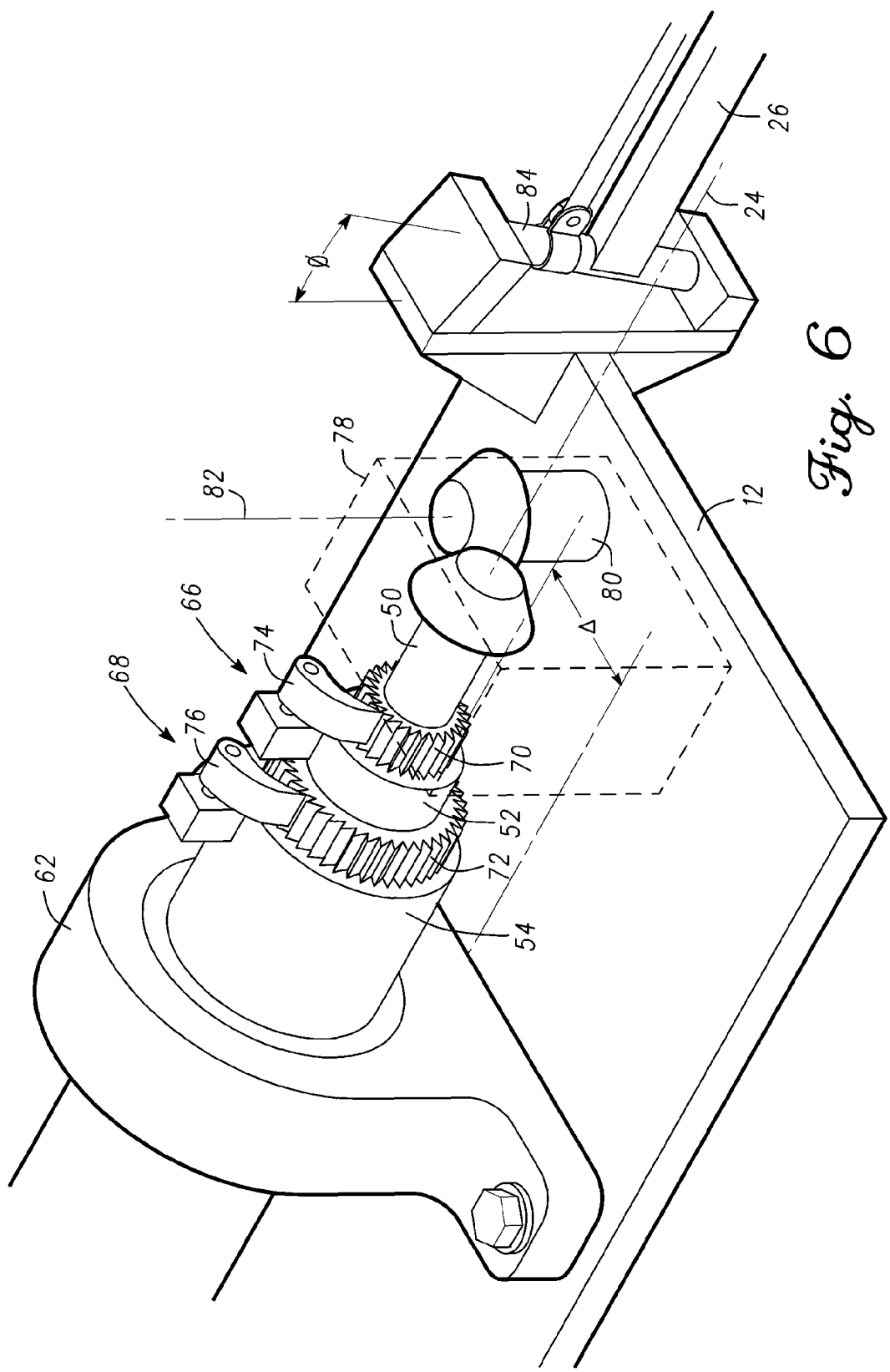
FIG. 6 is a rear perspective view of the embodiment of FIG. 1 showing details of the power transmission system.

Referring now to FIGS. 5-6, horizontal shaft 14 is made up of three concentric shaft members 50, 52 and 54. Shaft members 52 and 54 are hollow tubes. The forward end of shaft member 50 is supported by a bearing 56 received within the hollow end of shaft member 52. Shaft member 52, in turn is supported by a bearing 58 received within the hollow end of shaft member 54. Shaft member 54 is attached to wind machine head by bearings mounted within housings 60 and 62, which are attached to wind machine head 12. The rearward ends of shaft members 50 and 52 are supported within shaft members 52 and 54 in a like-manner and therefore will not be discussed in detail.

As shown most clearly in FIG. 6, shaft members 50, 52 and 54 are coupled together by means of overrunning clutches 66 and 68. Overrunning clutch 66 allows shaft member 50 to rotate faster than shaft member 52. Overrunning clutch 68 allows shaft member 52 to rotate faster than shaft member 54. In the illustrative embodiment of FIG. 6, overrunning clutches 66 and 68 comprise ratchets consisting of ratchet wheels 70 and 72 together with corresponding ratchet pawls 74 and 76.

As can be determined from an inspection of FIG. 6, if shaft member 52 tries to rotate in a counterclockwise direction at a speed that is equal to or faster than the counterclockwise rotation of shaft member 50, then torque is transmitted from shaft member 52 to shaft member 50 via overrunning clutch 66. However, if shaft member 52 rotates at a slower speed than shaft member 50, no torque is transmitted between the two shafts. Overrunning clutch 68 similarly transmits torque from shaft member 54 to shaft member 52 only if shaft member 54 is trying to turn faster than shaft member 52.

Wind machine 10 generates more torque than a conventional wind machine of the same size because there are three different sets of sails each generating torque and transmitting that torque to one of the coupled shaft members 50, 52, 54. The coupled shafts then combine the torque and transmit it to the load via vertical shaft 80 and right-angle drive 78.

With further reference to FIG. 6, because the longitudinal axis 15 of horizontal shaft 14 is offset by a distance Δ from the vertical pivot axis 82 of wind machine head 12, the force of the wind acting on rotors 16, 18 and 20 produces a torque about vertical pivot axis 82. In extreme high wind conditions, this torque will cause longitudinal axis 15 to swing away from the wind direction thereby preventing an over-speed condition. As wind machine head 12 swings away from the wind direction, rudder 26 pivots relative to wind machine head 12. Rudder 26 is mounted on a pivot 84 that is canted at an angle φ relative to vertical. Thus, as rudder 26 pivots relative to wind machine head 12 rudder 26 swings upward. The upward motion of rudder 26 generates a restoring torque that moves longitudinal axis 15 back into the wind when the extreme high wind conditions subside.

Although certain illustrative embodiments and methods have been disclosed herein, it will be apparent from the foregoing disclosure to those skilled in the art that variations and modifications of such embodiments and methods may be made without departing from the invention. For example, although the illustrative embodiment of FIGS. 1-6 contemplates three rotors and three shafts all rotating in the same direction, two rotors and two shafts rotating in the same directions, or greater than three rotors and three shafts rotating in the same or different directions are contemplated as being within the scope of the invention. Further, it should be understand that it is within the scope of the invention for the multi-rotor wind machine design described herein to be utilized either separate from or in conjunction with sails having winglets. Similarly, although wind machine 10 is shown with overrunning clutches 66 and 68 comprising ratchet and pawls, other equivalent overrunning clutches such as ramp-and-ball, sprag-clutches or any other similar coupling means are considered to be equivalents and therefore within the scope of the invention.

Figure 7:
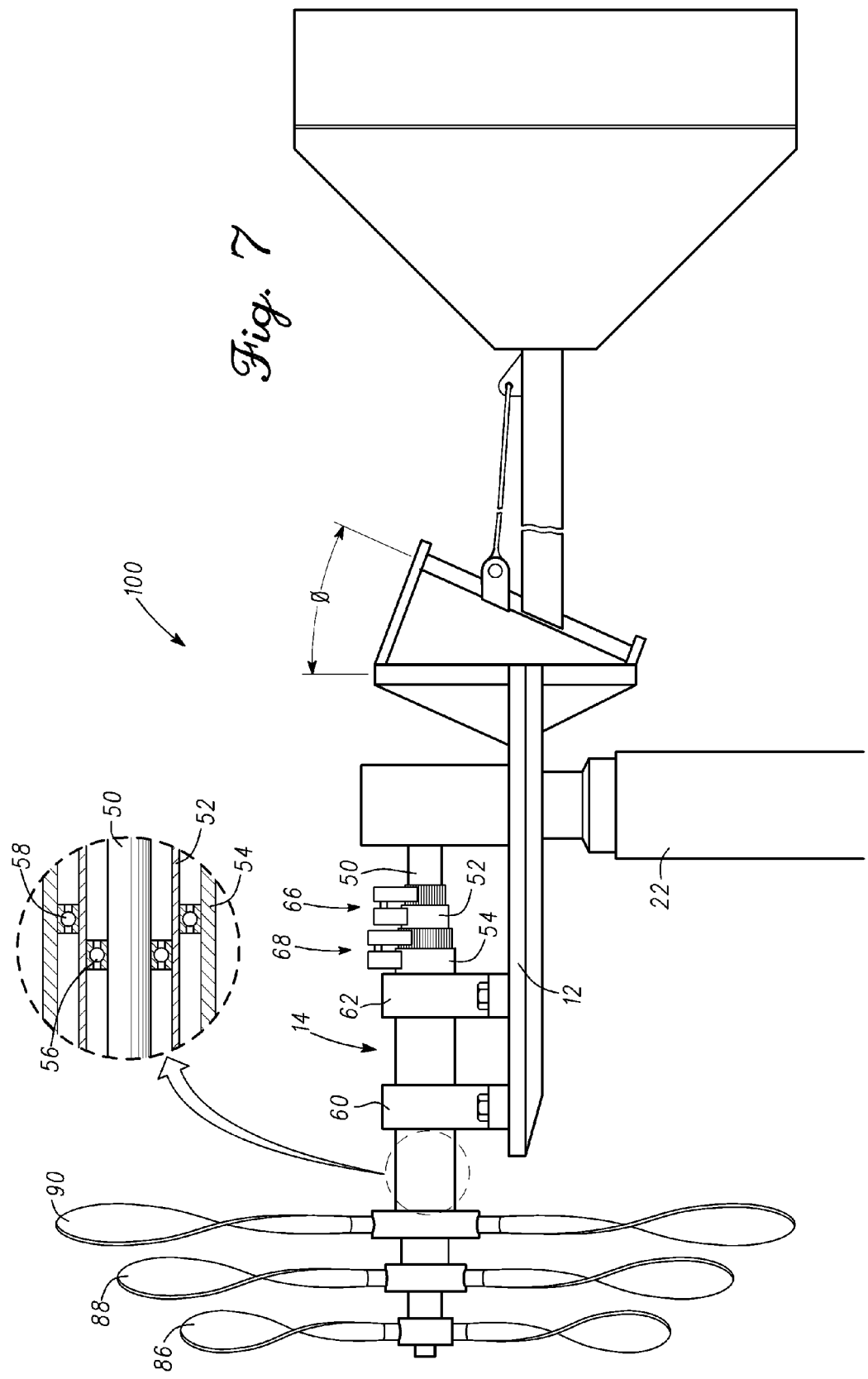
FIG. 7 is a side view of an alternative embodiment of a wind machine incorporating lift-type rotors in lieu of drag-type rotors.

Additionally, as shown in FIG. 7, wind machine 100 incorporating features of the present invention may incorporate airfoil lift-type rotors 86, 88 and 90 in lieu of the drag-type rotors of the embodiment of FIGS. 1-6. As with the embodiment of FIGS. 1-6, rotors 86, 88 and 90 may be of equal outside diameter, but preferably rotors 86, 88 and 90 increase in diameter in the downwind direction. This arrangement prevents the upwind rotor(s) from blocking the wind from the downwind rotor(s). Also, as with the embodiment of FIGS. 1-6, rotors 86, 88 and 90 are preferably coupled to concentric shafts 50, 52, 54 respectively, which are coupled together by means of overrunning clutches 66 and 68.

Wind machine 10 may be used for AC or DC electric power generation, pumping water, or any other task performed by wind machines and therefore the invention is not intended to be limited to the manner in which the power is transmitted to the ultimate load. Accordingly, it is intended that the invention should be limited only to the extent required by the appended claims and the rules and principles of applicable law. Additionally, as used herein, unless otherwise specifically defined, the terms "substantially" or "generally" when used with mathematical concepts or measurements mean within ±10 degrees of angle or within 10 percent of the measurement, whichever is greater.

What is claimed is:

1. A wind machine adapted to extract work from the wind comprising:
a first rotor shaft having a substantially horizontal axis of rotation;
a bearing support capable of aligning the axis of rotation of said first rotor shaft with the wind direction;
a first wind machine rotor rotatable about said first rotor shaft, said first wind machine rotor comprising a first hub attached to said first rotor shaft and a first plurality of sails attached to said hub, said first plurality of sails extending substantially radially outward substantially equidistant from said hub to form a rotor having an outer diameter;
a second wind machine rotor displaced axially downwind from said first wind machine rotor, said second wind machine rotor comprising a second hub and a second plurality of sails attached to said hub extending substantially radially outward substantially equidistant from said hub to form a rotor having an outer diameter, the outer diameter of said second wind machine rotor being larger than the outer diameter of said first wind machine rotor; and
a single vertical output shaft coupled to the first rotor shaft for extracting power from said first and second wind machine rotors.

2. The wind machine of claim 1, wherein:
said first and second plurality of sails each have a root and a tip, the roots of said second plurality of sails defining an inner diameter of said second wind machine rotor that is equal to the outer diameter of said first wind machine rotor within ½ the average length of the second plurality of sails measured from root to tip.

3. The wind machine of claim 1, further comprising:
a second rotor shaft mounted for rotation coaxially with said first rotor shaft, wherein said second wind machine rotor is attached to said second rotor shaft and said second rotor shaft is coupled to said first rotor shaft.

4. The wind machine of claim 3, wherein:
said second rotor shaft is coupled to said first rotor shaft via an overrunning clutch.

5. The wind machine of claim 4, wherein;
said overrunning clutch comprises a ratchet wheel and pawl.

6. The wind machine of claim 1, further comprising:
a third wind machine rotor displaced axially downwind from said second wind machine rotor, said third wind machine rotor comprising a third hub and a plurality of sails attached to said third hub extending substantially radially outward substantially equidistant from said third hub to form a rotor having an outer diameter, the outer diameter of said third wind machine rotor being larger than the outer diameter of said second wind machine rotor, said first, second, and third wind machine rotors rotating in a common rotational direction.

7. The wind machine of claim 6, further comprising:
second and third rotor shafts mounted for rotation coaxially with said first rotor shaft, said second wind machine rotor being attached to said second rotor shaft, said third wind machine rotor being attached to said third rotor shaft, wherein said second rotor shaft is coupled to said first rotor shaft by a first overrunning clutch and said third rotor shaft is coupled to said second rotor shaft by a second overrunning clutch.

8. The wind machine of claim 7, wherein;
said first and second overrunning clutches each comprises a ratchet wheel and pawl.

9. A wind machine adapted to extract work from the wind comprising:
a first rotor shaft having a substantially horizontal axis of rotation;
a second rotor shaft mounted for rotation concentric to said first rotor shaft
a bearing support capable of aligning the axes of rotation of said first and second rotor shafts with the wind direction;
a first wind machine rotor attached to said first rotor shaft, said first wind machine rotor having an outer diameter, said first wind machine rotor being responsive to a flow of wind to rotate in a first rotational direction;

a second wind machine rotor attached to said second rotor shaft, said second wind machine rotor being displaced axially downwind from said first wind machine rotor, said second wind machine rotor being responsive to the flow of wind to rotate also in the first rotational direction, the outer diameter of said second wind machine rotor being larger than the outer diameter of said first wind machine rotor;

an overrunning clutch coupling said second rotor shaft to said first rotor shaft; and a single vertical output shaft coupled to the first rotor shaft for extracting power from said first and second wind machine rotors.

10. The wind machine of claim 9, wherein:

said first rotor shaft is coupled to a load.

11. The wind machine of claim 9, further comprising:

a third wind machine rotor displaced axially downwind from said second wind machine rotor, the outer diameter of said third wind machine rotor being larger than the outer diameter of said second wind machine rotor.

12. The wind machine of claim 11, further comprising:

a third rotor shaft mounted for rotation concentric to said first rotor shaft, wherein said third wind machine rotor is attached to said third rotor shaft, said first, second, and third wind machine rotors rotating in a common rotational direction.

* * * * *